(12) United States Patent
Dykes

(10) Patent No.: US 8,228,336 B1
(45) Date of Patent: Jul. 24, 2012

(54) INTEGRATING A MOTION SYNTHESIS SYSTEM INTO A VIDEO GAME SYSTEM

(75) Inventor: Steven B. Dykes, San Rafael, CA (US)

(73) Assignee: Lucasfilm Entertainment Company Ltd., San Francisco, CA (US)

( * ) Notice: Subject to any disclaimer, the term of this patent is extended or adjusted under 35 U.S.C. 154(b) by 0 days.

(21) Appl. No.: 13/050,718

(22) Filed: Mar. 17, 2011

Related U.S. Application Data

(62) Division of application No. 12/011,052, filed on Jan. 23, 2008.

(51) Int. Cl.
*G06T 13/00* (2011.01)

(52) U.S. Cl. ........................ 345/473; 345/958

(58) Field of Classification Search .................. 345/473, 345/958
See application file for complete search history.

(56) References Cited

U.S. PATENT DOCUMENTS

| | | | |
|---|---|---|---|
| 6,057,859 A | 5/2000 | Handelman et al. | |
| 6,947,046 B2 | 9/2005 | Nimura et al. | |
| 7,403,202 B1 * | 7/2008 | Nash | 345/474 |
| 2006/0274070 A1 | 12/2006 | Herman et al. | |
| 2008/0309664 A1 * | 12/2008 | Zhou et al. | 345/420 |
| 2009/0091563 A1 | 4/2009 | Viz et al. | |

OTHER PUBLICATIONS

Euphoria Unique Game Moments, NaturalMotion Euphoria, [online] (retrieved on Mar. 12, 2009). Retrieved from the Internet: <URL: http://www.naturalmotion.com/euphoria.htm>, 3 pages.

Dynamic Motion Synthesis, White Paper, NaturalMotion Ltd, Oxford, UK, Mar. 2005 [online] (retrieved on Mar. 12, 2009). Retrieved from the Internet: <URL: www.naturalmotion.com/files/white_paper_dms.pdf >, 3 pages.

Unique Game Moments, Next-generation Game Play, White Paper, NaturalMotion Ltd., Oxford, UK, Mar. 2006 [online] (retrieved on Mar. 12, 2009). Retrieved from the Internet: <URL: www.naturalmotion.com/files/white_paper_ugm.pdf >, 3 pages.

* cited by examiner

*Primary Examiner* — Maurice L McDowell, Jr.

(74) *Attorney, Agent, or Firm* — Fish & Richardson P.C.

(57) ABSTRACT

The present disclosure includes, among other things, systems, methods and program products for integrating a motion synthesis system into a video game system.

12 Claims, 10 Drawing Sheets
(4 of 10 Drawing Sheet(s) Filed in Color)

INTEGRATING A MOTION SYNTHESIS SYSTEM INTO A VIDEO GAME SYSTEM

CLAIM OF PRIORITY

This application is a divisional of U.S. patent application Ser. No. 12/011,052, filed on Jan. 23, 2008, the entire contents of which are hereby incorporated by reference.

BACKGROUND

In a typical video or computer game, one or more human players interact with a game system to control animated characters or objects in a virtual world. For example, a human player can command a hero character to run from several villain characters. The game system controls each of the villain players, but also controls aspects of the hero character, such as precise movements of the hero character's animated legs as it moves.

When the game system is controlling a character, it determines the character's actions and animates the character performing those actions. Game systems in various implementations use scripted animation, procedural animation, or a combination of these. With scripted animation, a character's movements are predefined, and the motion of the character will be the same each time the script is used. Scripted animations include walking animations, or a character swinging a sword, for example. Key frame animation is an example of scripted animation. With procedural animation, conditions and constraints relating to the character are defined, and the system determines the motion of the character based on these and a set of rules, e.g., the laws of physics. The final animation produced by procedural animation is not predetermined—varying the initial conditions and constraints produces different animations. Inverse kinematic animation is an example of procedural animation.

A motion synthesis system generates motion data that describes the motion of a character or object using procedural animation techniques. One example of a motion synthesis system is the Euphoria system available from NaturalMotion Ltd. of Oxford, United Kingdom. Motion synthesis systems go beyond traditional procedural animation systems that are usually based on the laws of physics, and instead simulate active, intelligent human behavior such as running or jumping by simulating muscle contractions and typical human movement patterns. However, such systems can be difficult to use due to their proprietary application programming interfaces (APIs).

SUMMARY

In general, one or more aspects of the subject matter described in this specification can be embodied in one or more methods that include identifying a first motion behavior to be applied to a computer-generated character, where the character is defined by a full skeleton representation that comprises a plurality of first bones, and the character is also defined by a simplified skeleton representation that comprises a plurality of second bones, where the second bones are fewer than the first bones. The first motion behavior is converted to one or more second motion behaviors where each of the second motion behaviors is configured to be applied to the simplified skeleton representation or a part thereof. The one or more second motion behaviors are provided to a motion synthesis system. A first description of motion for the simplified skeleton representation based on the one or more second motion behaviors is obtained from the motion synthesis system. And a second description of motion for the full skeleton representation is determined based on the first description of motion and a mapping between the full skeleton representation and the simplified skeleton representation. Other implementations of this aspect include corresponding systems, apparatus, and computer program products.

These and other aspects can optionally include one or more of the following features. Each of the first and second motion behaviors specify one or more movements for the character or one or more parts of the character. The motion synthesis system procedurally generates the description of motion for the simplified skeleton representation by simulating human motion and receiving input from a physics engine. The first motion behavior includes one or more first parameters. At least one of the second motion behaviors includes one or more second parameters. The second parameters are based on the first parameters and one or more random numbers. Determining the second description of motion for the full skeleton representation comprises for one or more full skeleton bones, performing the following actions: 1) determining whether the mapping between the full skeleton representation and the simplified skeleton representation specifies that the full skeleton bone corresponds to a simplified skeleton bone; 2) if the full skeleton bone corresponds to a simplified skeleton bone, assigning the full skeleton bone the first description of motion for the corresponding simplified skeleton bone; and 3) if the full skeleton bone does not correspond to a simplified skeleton bone, determining a third description of motion for the bone and assigning the bone the third description of motion.

These and other aspects can optionally include one or more of the following additional features. Determining the third description of motion for the full skeleton bone comprises combining first descriptions of motion for one or more nearby bones in the simplified skeleton, where the mapping between the full skeleton representation and the simplified skeleton representation identifies the one or more nearby bones in the simplified skeleton. Determining the third description of motion for the full skeleton bone comprises obtaining motion data from an animation script or keyframe data. Determining the third description of motion for the full skeleton bone comprises creating motion data procedurally using a physics engine.

In general, one or more additional aspects of the subject matter described in this specification can be embodied in one or more methods that include identifying a computer-generated character comprising one or more parts that are interpenetrating in a real-time game environment, where the character is represented by a hierarchical tree structure of parts and the root of the tree is a central part and the leaves of the tree are extremity parts. The parts of the character that are interpenetrating and the parts further from the root of the tree than the interpenetrating parts in the hierarchical tree structure are disabled from collisions. The character is procedurally animated using a motion synthesis system and a physics engine for a pre-determined amount of simulated time; and re-enabling collisions of the disabled parts. Other implementations of this aspect include corresponding systems, apparatus, and computer program products.

These and other implementations can optionally include one or more of the following features. The step of identifying a computer-generated character comprising one or more parts that are interpenetrating in a game environment comprises: 1) detecting two parts of the character that are separated by a distance that exceeds a constraint threshold; and 2) raycasting between the two parts and determining whether an object is between them.

Particular embodiments of the invention can be implemented to realize one or more of the following advantages. Parameters can be constructed, sequenced and controlled for motion synthesis system behaviors in a data-driven way, such that artists or animators can iterate on them without the assistance of a programmer. This allows for creating a greater variety of high fidelity character behaviors than would be possible with the basic motion synthesis system technology. Basic motion synthesis results are enhanced with procedural or scripted motion for higher fidelity motion. Techniques for correcting character interpenetration are also provided.

The details of one or more embodiments of the invention are set forth in the accompanying drawings and the description below. Other features, aspects, and advantages of the invention will become apparent from the description, the drawings, and the claims.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

Like reference numbers and designations in the various drawings indicate like elements.

DETAILED DESCRIPTION

Figure 1A:
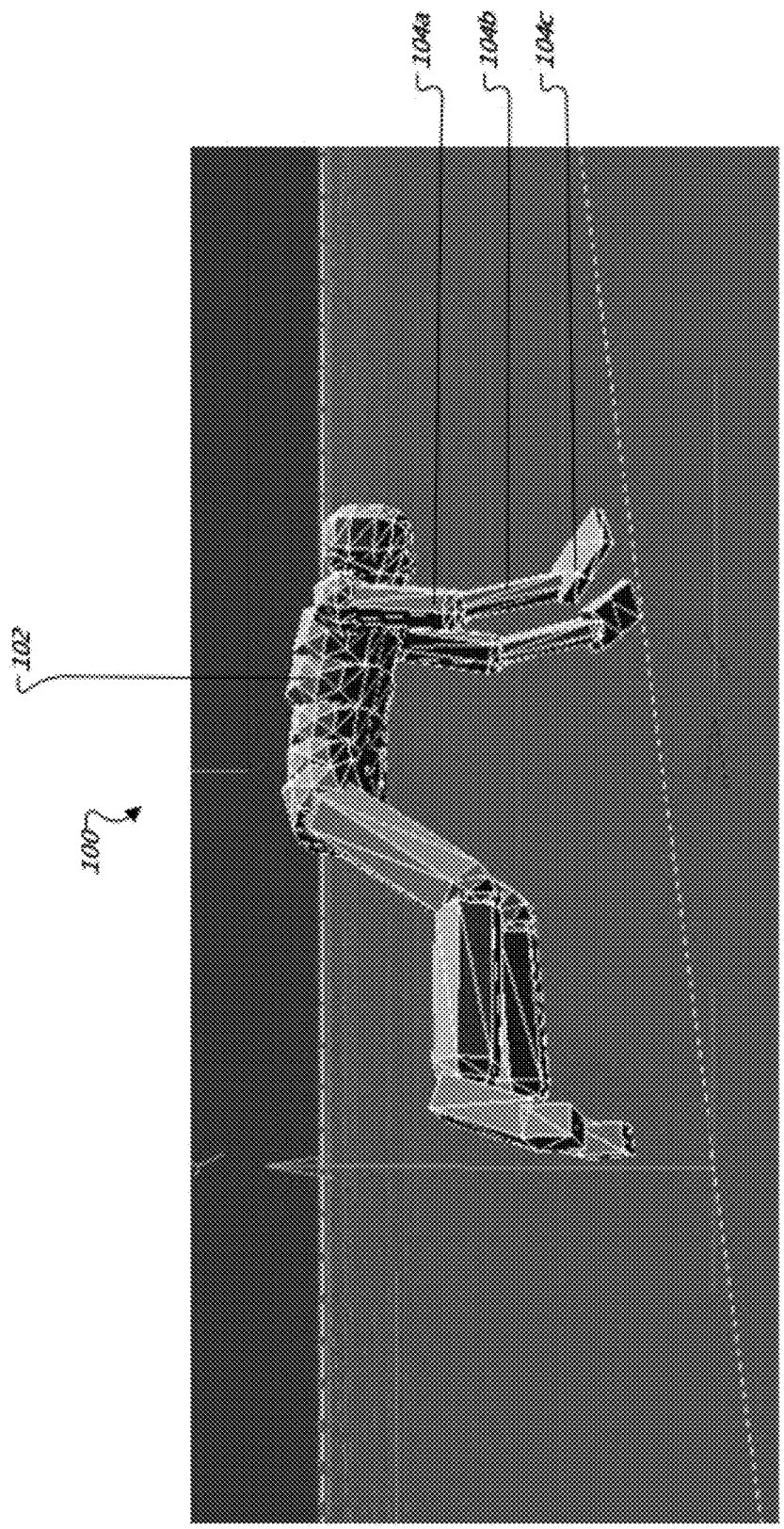
FIGS. 1A-1C are screenshots showing example procedural animations.
Figure 1B:
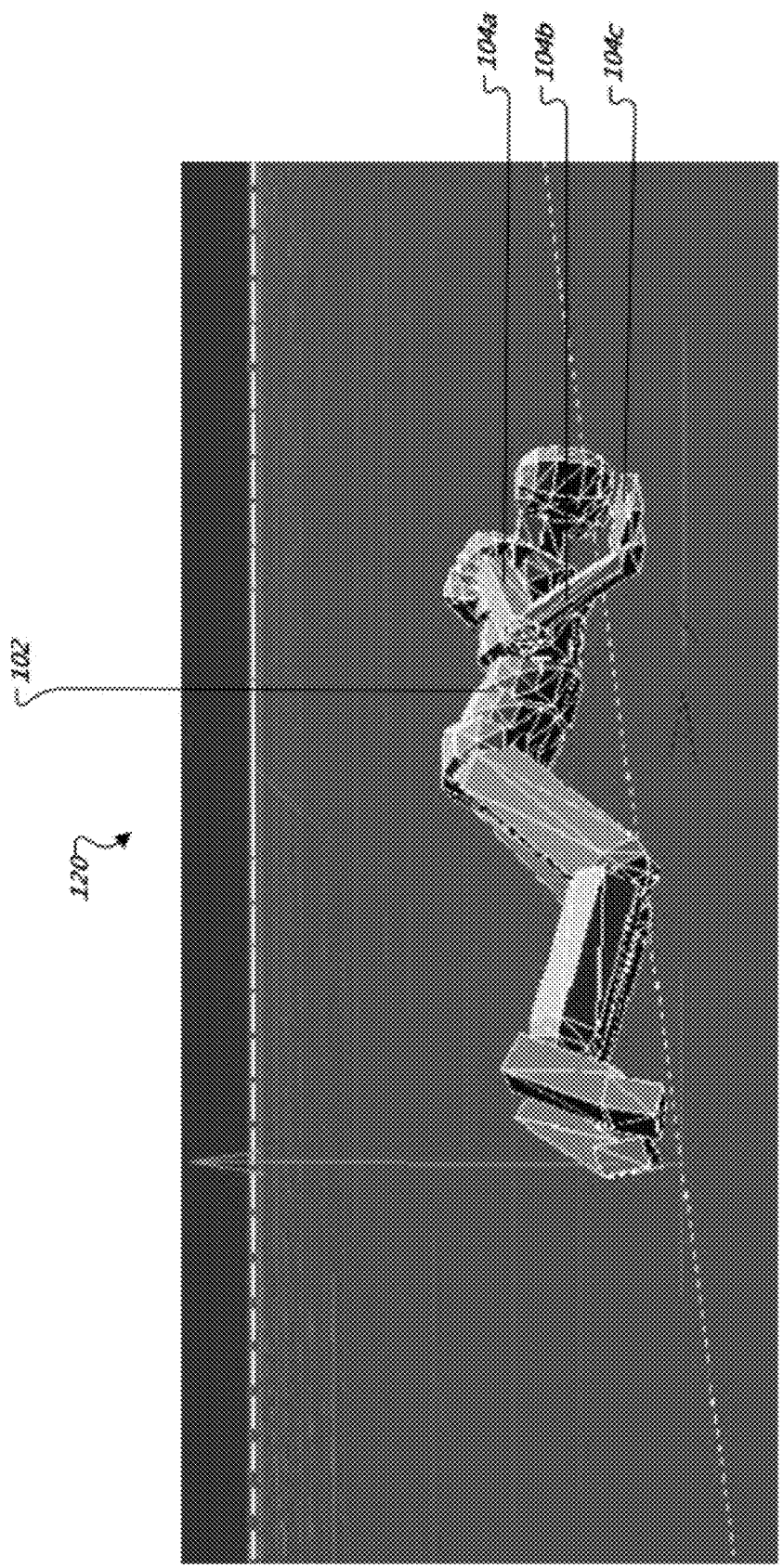
Figure 1C:
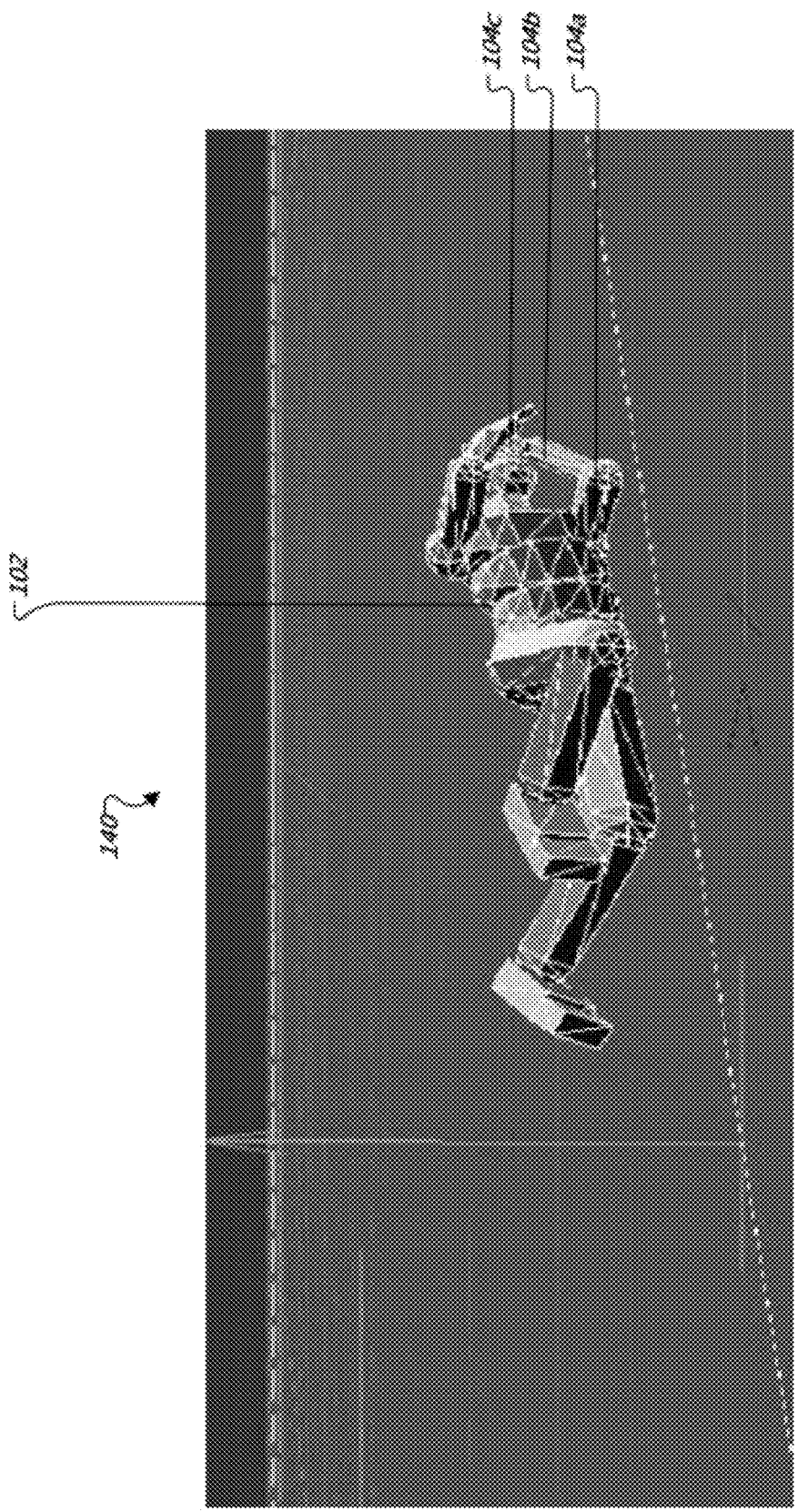

FIGS. 1A-1C are screenshots showing example procedural animations 100, 120, and 140, respectively. In general, a procedural animation can be used to generate motion data for a character or object represented in a game. Motion data can include, but is not limited to, one or more transformations that provide a description of the motion for one or more parts of a character or an object. For example, one or more translation matrices, one or more rotational matrices, or any combination thereof can be used to provide transformations that are used as a description of motion. In various implementations, the motion data describes the motions of one or more of the character's bones. For example, as illustrated in FIG. 1A, character 102 is represented by a simple skeleton that is procedurally animated (e.g., in procedural animation 100) to extend its arms in anticipation of striking the ground.

Within this document, we define the term "simple skeleton" to mean a skeleton that contains fewer bones than a more complex skeletal structure. For example, consider character 102. Each arm is made up of only three bones: an upper arm bone 104a, a forearm bone 104b, and a hand bone 104c.

A more complex skeletal structure (e.g., a full skeleton, described in reference to FIGS. 2 and 4) may include an upper arm bone, two bones in the forearm (e.g., corresponding to the ulna and radius), and many bones in the hand (e.g., corresponding to one or more bones in any or all of the carpals, metacarpals, and phalanges) or some other skeletal configuration that includes more bones than the simple skeleton, for example. In some implementations, the number of bones is related to the amount of joint expression that is used.

For example, if a character does not usually open or close their hand (e.g., because they are typically carrying an object), then a more complex skeletal structure for the hand may not be necessary. Within this document, we define the term "joint expression" to mean a capacity to manipulate a character or object using an inter-skeletal joint. For example, opening and closing a hand with multiple bones may express numerous joints. As another example, because the character 102 is defined with only a few arm bones, the character 102 can only express joints between upper arm bone 104a and forearm bone 104b, and forearm bone 104b and hand bone 104c. Full skeletons are described in more detail in reference to FIG. 2.

In reference to FIG. 1B, as the character 102 strikes the ground, a new procedural animation 120 is generated to produce a description of motion that corresponds to the in-game character catching themselves. For example, the positions of the arm bones 104a, 104b, and 104c have been modified to represent an arm that is bent to break the fall of the character 102. In addition, certain constraints can also be enforced to ensure that the character 102 is moving in an intelligent, human-like manner. For example, as the character hits the ground, each bone is acted upon by a set of physical forces. One or more constraints can be enforced to ensure that the hand bone 104c remains connected to the forearm bone 104b and the forearm bone 104b remains connected to the upper arm bone 104a, to name a few examples.

In reference to FIG. 1C, once the character 102 is on the ground, a new procedural animation 140 can be generated to produce a description of motion that corresponding to the in-game character rolling over; possibly as a precursor to a procedural animation where the in-game character rises to their feet. As show in procedural animation 140, bones 104a, 104b, and 104c move in a manner congruent with the act of rolling over. In addition, because the constraints are still enforced, the force of the movement does not displace the connectivity between the bones 104a, 104b, and 104c beyond a certain tolerance (e.g., as described by the constraints).

Figure 2:
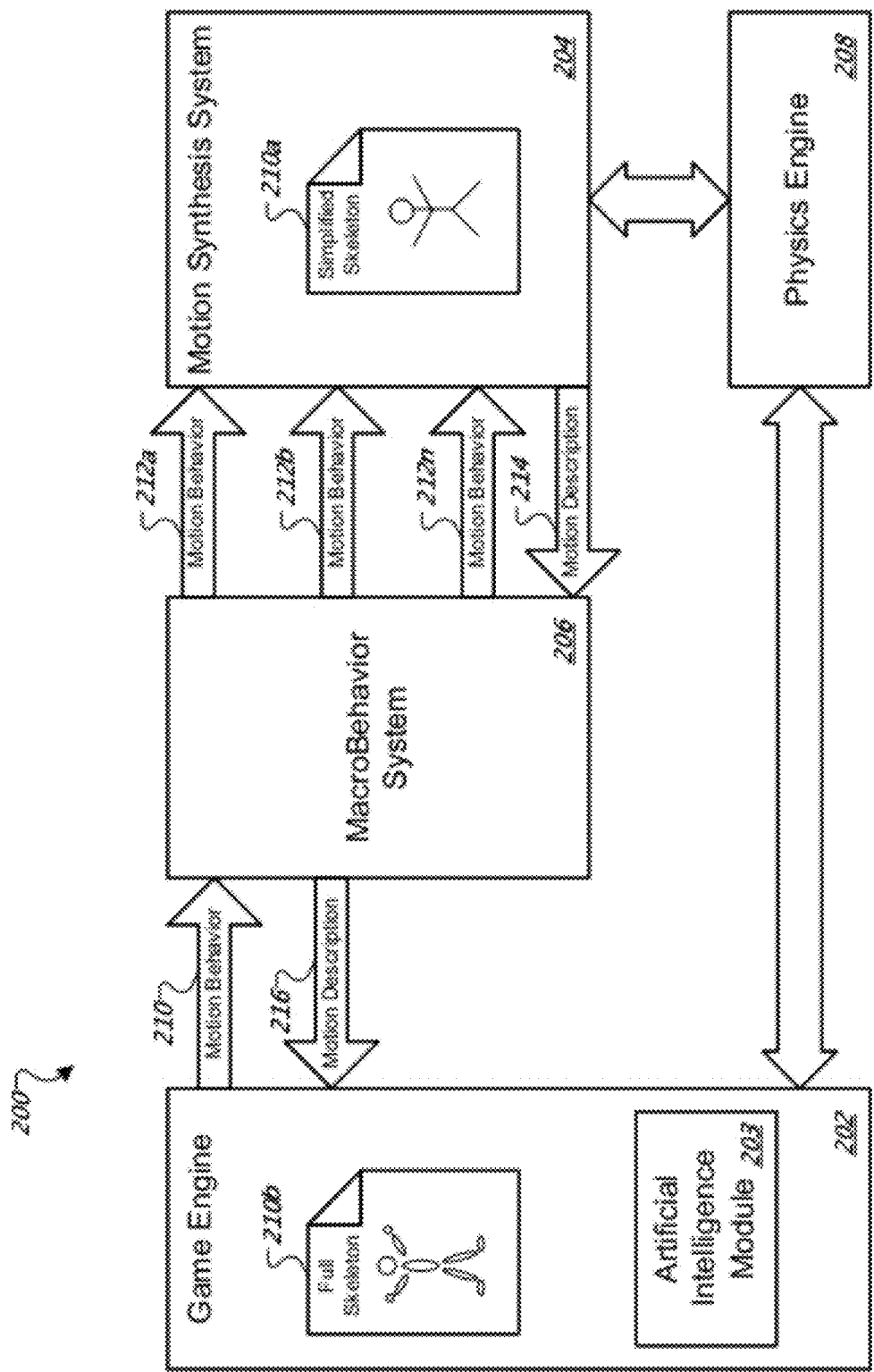
FIG. 2 is a block diagram showing an example computer game system.

FIG. 2 is a block diagram showing an example video game system 200. In general, the video game system 200 can use some or all of a procedurally generated animation for a simplified skeleton and generate additional joint expressions for a more complicated skeleton. In various implementations, the simplified skeleton is used by a motion synthesis system that generates procedural animations for the simplified skeleton. Once the procedural animation has been generated, the video game system 200 can use the procedural animations generated for the simplified skeleton in combination with additional animations (e.g., both procedural and non-procedural animations) to provide animations for the more complicated skeleton.

As illustrated by FIG. 2, the game system 200 includes a game engine 202, a motion synthesis system 204, a macro behavior system 206, and a physics engine 208. In general, the game engine 202 includes instructions, that when executed, receive user input, process the user input, modify in-game objects, and display the results of the received user input, to name a few example. In other words, the game engine 202 generates the game's virtual world and allows the user to interact with objects in the virtual world. In various implementations, the game engine 202 accesses one or more stored representations of objects in the virtual world and renders them on a display device. For example, the game engine 202 can access a character with full skeleton 210b, and generate an in-game representation through a variety of rendering techniques. Rendering techniques include, but are not limited to, rasterization, ray casting, and ray tracing, to name a few examples. In addition, the game engine 202 includes an artificial intelligence (AI) module 203. In general, the AI module 203 is responsible for controlling characters or objects that are either partially controlled, or not controlled by the user using, for instance, deterministic or non-deterministic techniques such as pattern movement, flocking, potential function-based movement, finite state machines, fuzzy logic, rule-based AI, Bayesian techniques, neural networks, and genetic algorithms. For example, in a squad-based game, the user may provide commands to certain other squad members, but the AI module 203 may execute those commands or alter those commands based on the current state of the virtual world.

If the user wants to move a character in the virtual world, the user can specify an in-game action through a user input device (e.g., a mouse, keyboard, game pad, other input device, or any combination thereof). The game engine 202 can translate these received inputs into one or more motion behaviors. Motion behaviors include, but are not limited to, standing, sitting, running, falling, and jumping, to name a few examples. In addition, the game engine 202 can generate motion behaviors corresponding to actions generated by an AI module 203. In various implementations, motion behaviors generated by the AI module 203 are applied to computer-controlled characters. For example, the AI module can determine that a computer-controlled character should run after the player controlled character and generate one or more appropriate motion behaviors.

The game engine 202 can provide the one or more selected motion behaviors to the macro behavior system 206. In general, the macro behavior system 206 can map motion behaviors from the game engine 202 to motion behaviors for the motion synthesis system 204, and can modify one or more parameters of the mapped motion behaviors that are then provided to motion synthesis system 204. For example, in response to user input, the game engine 202 can generate motion behavior 210 and provide it to macro behavior system 206. In response, macro behavior system 206 can generate one or more motion behaviors 212a-212n that are provided to motion synthesis system 204. In some implementations, the motion behavior 210 and any of 212a-212n are substantially similar. In other implementations, the motion behavior 210 and any of 212a-212n are different. For example, motion behavior 210 may describe a jumping motion behavior, while 212a-212n may describe motion behaviors associated with the character bending their knees, extending their legs, swinging their arms, bracing for impact, or other motion descriptions. In various implementations, the motion synthesis system 204 can provide a motion description 214 to the macro behavior system 206. In general, the motion description 214 can be used by the macro behavior system 206 to generate a second description of motion 216, described in more detail below. The motion description 216 can be used by the game engine 202 to animate full skeleton 210b. The macro behavior system 206 is described in more detail in reference to FIG. 5.

The motion synthesis system 204 receives the one or more motion behaviors and applies them to a simplified skeleton. For example, motion synthesis system 204 can apply any or all of the received motion behaviors 212a-212n to simplified skeleton 210a. In various implementations, the simplified skeleton is a simplified representation of a skeleton used on an in-game character. For example, simplified skeleton 210a is a representation of full skeleton 210b. In other words, in reference to FIGS. 1A-1C, character 102 can be represented by simple skeleton 210a in the motion synthesis system 204 and by full skeleton 210b in the game engine 202.

In various implementations, during the generation of the procedural animations, the motion synthesis system 204 can use physics engine 208 to provide additional information that may be used to generate the description of motion. For example, the motion system 204 can provide attributes of the character through an application programming interface (API). In response, the physics engine 208 can determine trajectory and/or the position of the in-game character that is procedurally animated, to name two examples. In general, the physics engine 208 exerts one or more physical forces (e.g., gravity, friction, acceleration, and combinations thereof) on the character or object. For example, in reference to FIG. 1A, gravity can be exerted on the character 102 to determine a rate of descent as an animation for the character 102 is procedurally generated to extend the character's arms to brace for impact. The determined trajectory and/or position of the in-game character can be used to modify the one or more portions of the procedurally generated animations generated by motion synthesis system 204.

For example, the transformations that describe one or more portions of the procedurally generated animation can be altered by the addition of motion imparted by the physical forces that are applied by the physics engine 208 to the character. In various implementations, the modified descriptions may be provided to the motion synthesis system 204 to procedurally generate motion descriptions that are used by the game engine 202 to animate the in-game characters. An example physics engine 208 is Havok Physics available from Havok (San Francisco, Calif.). In some scenarios, the physics engine 208 may modify the descriptions of motion to such an extent that the modified descriptions are inconsistent with an intelligent, human-like motion. For example, the physics engine 208 may exert a large enough force to generate a motion where one or more of the character's limbs interpenetrates a wall, a table, or another in-game object, to name a few examples. In general, this interpenetration can cause the motion synthesis system 204 to generate a description of motion that is not similar to human-like motion. For example, the character may become stuck or move in an otherwise counter intuitive manner. Interpenetration is described in more detail in reference to FIGS. 6A-6B and FIG. 7.

The game engine 202 can use the motion description 216 provided by macro behavior system 206 to animate the full skeleton 210b. In various implementations, the game engine 202 or the macro behavior system 206 determines a mapping between the full skeleton 210b and the simple skeleton 210a. In cases where the bones in the full skeleton 210b map to a corresponding bone in the simple skeleton, the motion description for the corresponding bone in the full skeleton 210b is the motion description for the bone in the simple skeleton 210a. For example, consider a leg in the simple skeleton 210a that includes an upper leg bone, a lower leg bone, and a foot bone, and a leg in the full skeleton 210b that includes an upper leg bone (e.g., the femur), a knee cap bone (e.g., a patella bone), two lower leg bones (e.g., the tibia and fibula), and one or more bones of foot (e.g., metatarsals, phalanges, talus, or other bones in the foot). If the simple skeleton 210a is procedurally animated with a walking behavior, because the upper leg bone of the full skeleton 210b corresponds to the upper leg bone of the simple skeleton 210a, the game engine can apply a same or similar motion description to the upper leg bone of the full skeleton 210b.

In cases where a full skeleton 210b bone does not correspond to a simple skeleton 210a bone, the game engine 202 can determine a simulated description of motion for the bone. For example, the game engine 202 can identify motion data in a predefined animation script, keyframe data, or other motion description and apply it to the full skeleton 210b bone. As another example, the game engine 202 can use the physics engine 208 to determine a procedural animation for the full skeleton 210b bone. As another example, a description of motion for one or more nearby bones in the simple skeleton 210a can be combined and applied to a bone in the full skeleton 210b. In some scenarios, a combination of the approaches can be used. For example, keyframe data can be combined with procedurally generated motion from the physics engine 208 to generate a simulated description of motion for the full skeleton 210b.

Figure 3:
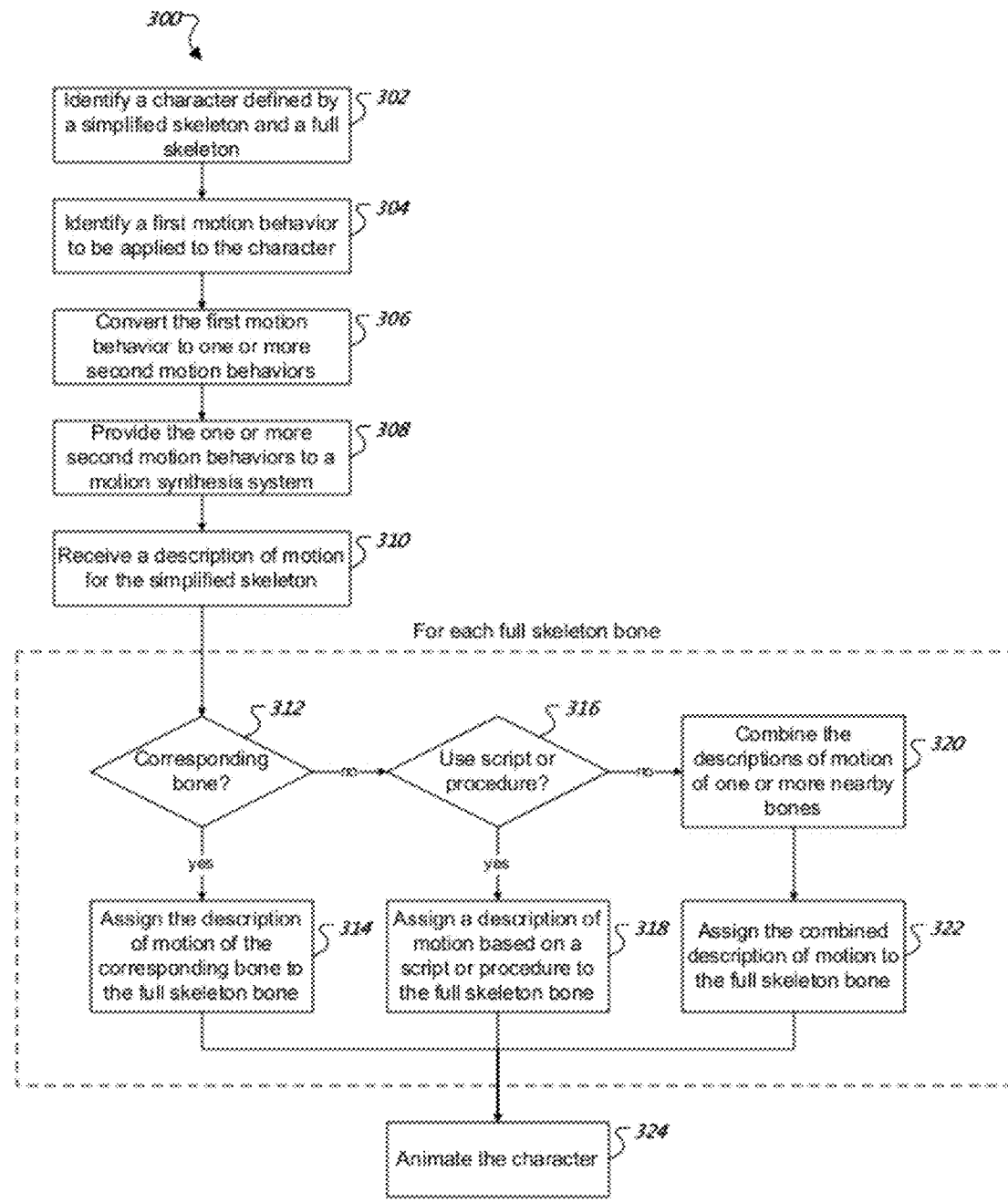
FIG. 3 is a flow chart of an example method for generating a description of motion for a full skeleton.

FIG. 3 is a flow chart of an example technique 300 for generating a description of motion for a full skeleton (e.g., full skeleton 210b). In general, the technique 300 can be used by the system 200 to generate one or more animations for the full skeleton 210b. In various implementations, the technique can be executed in response to user input or in response to a system 200 request. For example, game engine 202 may request an execution of technique 300 after a predetermined amount of time has elapsed (e.g., $\frac{1}{60}^{th}$ of a second). In general, technique 300 can be executed to generate the animation information for each image frame of a video game. In various implementations, game engine 202 can generate image frames on the order of a certain number of frames per second. For example, the game engine 202 may generate at least thirty frames per second. In general, the number of frames per second can depend on the parameters specified by the game engine 202, the rendering hardware, the graphics settings, other parameters, or computing resources used by other aspects of system 200, to name a few examples. These additional considerations may reduce the number of frames generated below thirty frames per second.

In step 302, system 200 identifies a character defined by both a simple skeleton and a full skeleton. For example, a character defined by simple skeleton 210a and a full skeleton 210b can be identified by system 200. In general, the skeletons 210a and 210b can be stored in memory, on a compact disk (CD), a digital versatile disk (DVD), or other storage medium. In some scenarios, the character can be obtained by identifying a character corresponding to received user input and the corresponding skeletal information obtained. For example, a player controlled character can be identified and their simple and full skeletal representations obtained when a user moves their respective in-game character. As another example, the character can be obtained when the user's character attacks another computer-controlled character. In other words, the computer-controlled character is identified as the target of the attack and the computer-controlled character's skeletal representations are obtained. In other scenarios, the character can be obtained by identifying a character corresponding to a game related event. For example, game engine 202 can identify a computer-controlled character through an AI event performed by AI module 203. For example, if the AI module 203 moves a computer controlled character towards a player controlled character the game engine 202 can identify the computer-controlled character from the AI event, and obtain their respective skeletal representations. As another example, if the AI module 203 instructs a controlled character to attack the player controlled character, the game engine 202 can identify the computer controlled character, the player controller character, or both and obtain skeletal representations for the computer controlled character, the player controlled character, or both.

In step 304, a first motion behavior to be applied to the character is identified. In some scenarios, the first motion behavior can be specified by the received user input. For example, if the user input specifies a running action, a running motion behavior to be applied to the character is identified. In other scenarios, the first motion behavior can be specified by the game engine 202. For example, a first motion behavior to be applied to a computer-controlled character can be identified corresponding to an action specified by the AI module 203.

In step 306, the first motion behavior is converted to one or more second motion behaviors. In general, the first motion behavior can be modified by one or more additional parameters. A motion behavior specifies motion characteristics for one or more skeleton bones in a character or an object. Such characteristics can include, but are not limited to, a path of travel through a volume, resistance, velocity, acceleration, and momentum at various points in time. For example, the first motion behavior corresponding to the speed of motion can be modified by the macro behavior system 206. As another example, parameters corresponding to 3-dimensional coordinates (e.g., X, Y, and Z coordinates) can be modified by the macro behavior system 206 to specify a range of motion, general direction, or other parameters of the motion behavior. In some scenarios, additional motion behaviors can be generated corresponding to the first motion behavior. For example, if a character is falling, a motion behavior corresponding to the character's head turning or arms flailing can also be generated by the macro behavior system 206.

In step 308, the one or more second motion behaviors are provided to a motion synthesis system. In general, the motion synthesis system receives the one or more second motion behaviors and generates a description of motion. For example, motion synthesis system 204 can receive second motion behaviors 212a-212n and generate one or more motion descriptions for simple skeleton 210a. In general, parameters included in the motion behaviors can be used by the motion synthesis system to procedurally generate realistic, human-like motion. For example, parameters can control the speed of motion for a particular character limb. In addition, the motion synthesis system can generate a general description for the motion based on the forces applied to that particular limb. The combination of the parameters with the general description of motion can yield a description of motion that is applied to the simple skeleton 210a. In some scenarios, the description of motion provided by the motion synthesis system is modified by other influences. For example, physics engine 208 can modify the descriptions of motion generated by motion synthesis system 204 to corresponding to a trajectory of the character or a position where the character lands, to name two examples.

In step 310, a description of motion for the simplified skeleton is received. For example, the physics engine 208 can provide the description of motion to the game engine 202. In response, the system 200 attempts to generate a description of motion for the full skeleton 210b. For example, for each bone of the full skeleton 210b, the system 200 may do any or all of the following:

In step 312, the system 200 can map the bones from the full skeleton 210b to the simple skeleton 210a. In some implementations, the system can determine a mapping by comparing the coordinates and/or names associated with a specific bone in a skeleton. For example, consider a bone with end points of $(X_1, Y_1, Z_1)$ and $(X_2, Y_2, Z_2)$ with the name "femur bone" in the simple skeleton 210a, and a bone with end points of $(X_1, Y_1, Z_1)$ to $(X_2, Y_2, Z_2)$ with the name "femur bone" in the full skeleton 210b. Because the coordinate ranges are same, the system 200 may determine that there is a correspondence between the two bones. The system 200 may also compare the bone names to aid in the determination of correspondence. For example, because both bones share the name "femur bone," the correspondence is reinforced.

If there is a correspondence, in step 314, the motion description of the corresponding bone is assigned to the full skeleton bone. For example, a description of motion for the "femur bone" in simple skeleton 210a is assigned to the "femur bone" of the full skeleton 210b.

If there is not a correspondence, in step 316, the system 200 determines if there is a predefined animation script or a technique for generating procedural animations that can be used to provide a description of motion. For example, the system 200 can access keyframe data associated with the character to determine if there is a predefined animation script that can be used to provide a description of motion for the full skeleton bone. As another example, in some scenarios, the physics engine 208 can be used to provide one or more procedural animations for the full skeleton bone.

If there is a predefined script or a mechanism for generating procedural animations, in step 318, the system 200 assigns a description of motion based on the script or procedure to the full skeleton bone.

If there is not a predefined animation script or procedure that can provide a description of motion then, in step 320, the system 200 combines the descriptions of motion of one or more nearby bones. For example, in a full skeleton with an upper leg bone, a kneecap bone, and two lower leg bones, the system 200 may combine the motion of the upper leg, and the two lower leg bones to generate a description of motion for the kneecap bone.

In step 322, the system 200 assigns the combined description of motion to the full skeleton bone. For example, in some implementations, the system 200 can interpolate between two motions and assign the interpolated description of motion to the full skeleton bone.

In step 324, the in-game character representation is animated corresponding to the description of motion assigned to one or more of the character's bones. For example, the system 200 can generate one or more frames of animation corresponding to the description of motion assigned to one or more of the character's bones. The one or more frames of animations can be generated using tradition animation techniques.

Figure 4A:
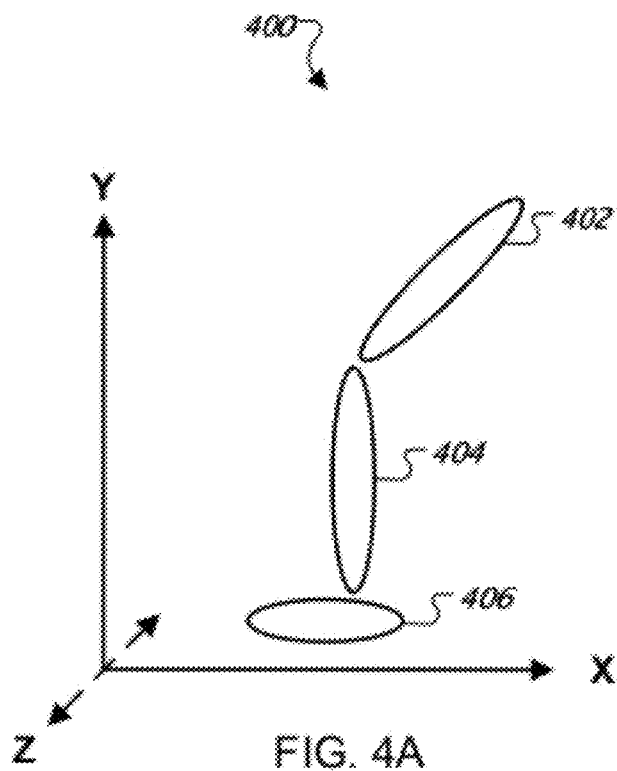
FIG. 4A is a diagram showing an example limb for a simple skeleton.
Figure 4B:
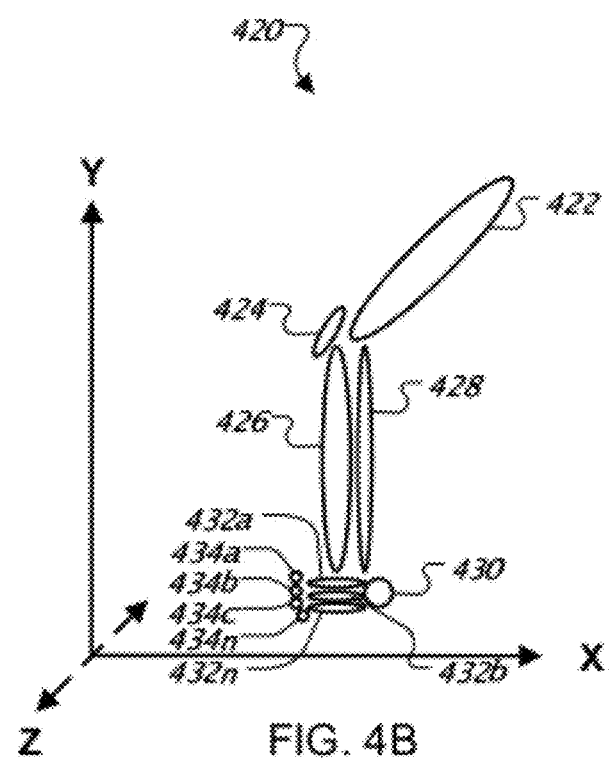
FIG. 4B is a diagram showing an example limb for a full skeleton.

FIGS. 4A and 4B are example limbs 400 and 420 for a simple skeleton and a full skeleton, respectively. The limb 400 includes three bones, an upper leg bone 402, a lower leg bone 404, and a foot bone 404. The limb 420 includes an upper leg bone 422, a kneecap bone 424, two lower leg bones, 426 and 428, a heel bone 430, and additional bones in the foot 432a-432n and 434a-434n.

As described in reference to FIG. 3, when the motion synthesis system 204 generates a description of motion, the system 200 attempts to determine a correspondence between each bone in limb 420 and a bone in limb 400. For example because the system 200 can map bone 422 to 402 (e.g., because they are in substantially similar locations and/or with substantially similar physical dimensions), the system 200 can determine a correspondence between the two bones. This correspondence can be used to determine some or all of a particular description of motion to apply to a bone. For example, because bone 422 corresponds to bone 402, the description of motion for bone 402 can be used to describe the motion for bone 422.

For other bones, such as bones 424, 426, 428, 430, 432a-432n, and 434a-434n the system 200 may not be able to determine a correspondence. Descriptions of motion can be generated for these bones in various ways. For example, because bones 426 and 428 express joints collectively, and not individually (e.g., if a joint is expressed using bone 426, bone 428 also is involved in the joint expression, and visa versa), a description of motion can be simulated for bone 428 using the description of motion for bone 426. As another example, in other scenarios, the description of motion can be generated by combining the description of motion of nearby bones. For example, the motion description for bone 424 may be determined by combining the motions of bones 404 and 402 to generate a new description of motion for bone 424. As another example, the description of motion may be determined by animation script and/or a procedurally generated animation for one or more of the bones. For example, motion for bones 432a-432n and/or bones 434a-434n can be described by an animation script, where the animation can be displayed (e.g., grafted, overlaid, or otherwise rendered) using the orientation of foot bone 406 that is specified by the description of motion for bone 406.

In some scenarios, an animation script and/or a procedurally generated animation may also modify the description of motion for one or more bones. For example, the motion descriptions for some or all of the bones in limb 420 can be modified by using physics engine 208 to determine one or more physical effects that are exerted on the bones in limb 420. As another example, keyframe data can be used to modify the motion data for one or more bones after an initial motion description has been determined.

Figure 5:
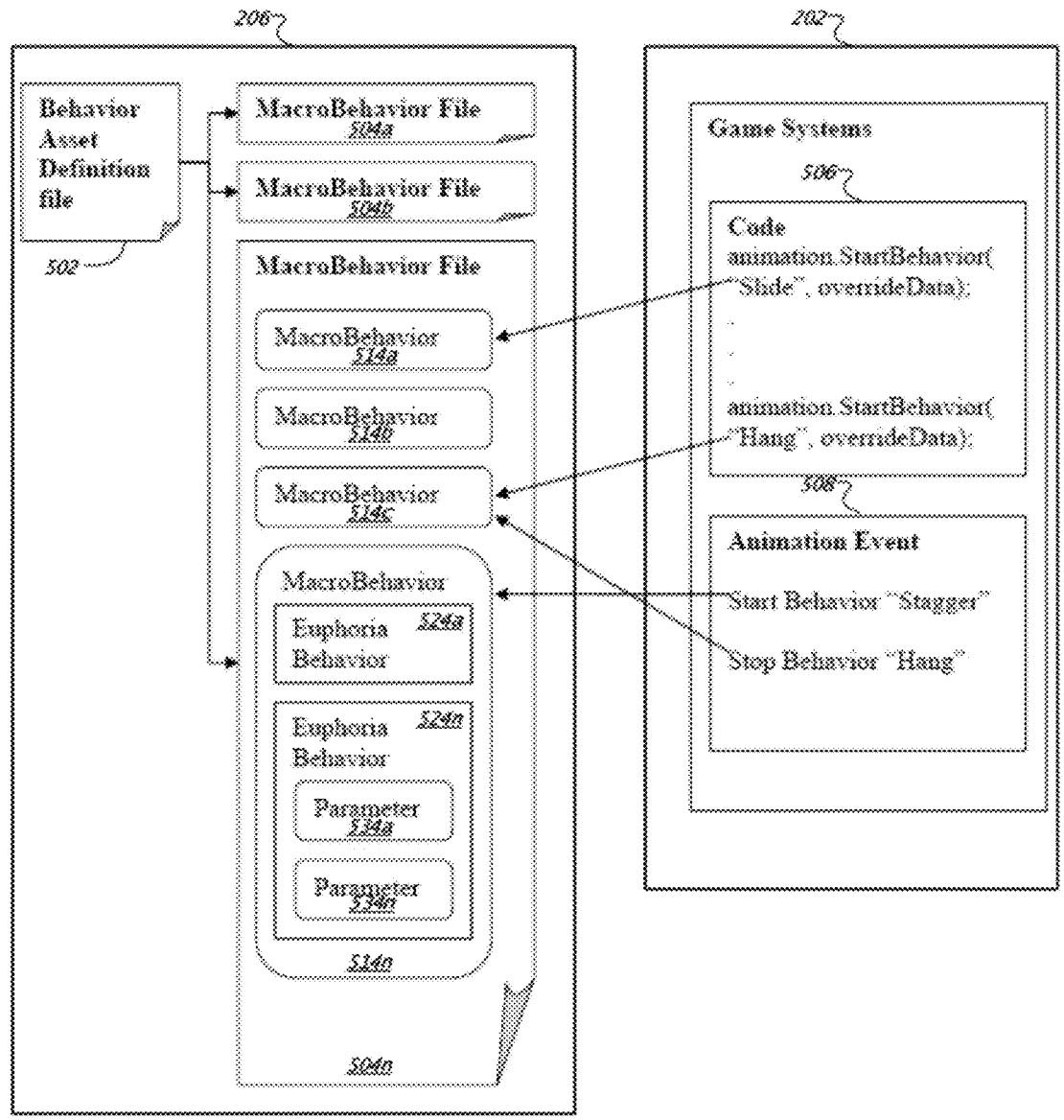
FIG. 5 is a block diagram showing an example macro behavior system.

FIG. 5 is a block diagram showing an example macro behavior system 206. In general, one or more commands can be received by the macro behavior system 206 using a first API. For example, in reference to FIG. 2, the game engine 202 can provide first motion behaviors to macro behavior system 206 though the first API. In addition, the macro behavior system 206 can provide instructions to other subsystems of system 200 using a second API. For example, in reference to FIG. 2, the macro behavior system 206 can provide second motion behaviors to motion synthesis system 204 using a second API.

In various implementations, the macro behavior system 206 can be used to override certain parameters used by the motion synthesis system 204 when generating one or more descriptions of motion. In various implementations, the parameters are modified by the incorporation of one or more files or through the execution of code during runtime operation. In addition, the macro behavior system 206 can be configured to override certain character assets or game characters. For example, a player-controlled character may walk in a different manner than a computer-controlled character. This allows the macro behavior system 206 to be used to configure different intelligent, human-like, descriptions of motion for different classes of in-game characters, for example. Moreover, the macro behavior system 206 is provided with a capacity to randomize one or more parameters to provide subtle and not-so-subtle differences in the like motions generated by the motion synthesis system 204. For example, a random staggering speed can be determined to generate two different descriptions of motion for a substantially similar staggering motion behavior. In various implementations, the macro behavior system 206 can be configured with one or more Extensible Markup Language (XML) files corresponding to a behavior asset definition file 502, and one or more macro behavior files (e.g., 504a-504n).

In general, the asset definition file 502 specifies a skeleton to motion synthesis body part mapping as well as one or more macro behavior files 504a-504n to load, to name two examples. An example of an asset definition file 502 is illustrated in TABLE 1:

TABLE 1

```
<Asset name="MaleAverage" numVolumes="25" euphoriaAssetID="0">
    <Volume name="Pelvis" bone="Hips[0]"/>
    <Volume name="Root" bone="Spine[0]"/>
    .
    .
    .
    <Volume name="RightToes" bone="rFoot[1]"/>
    <MacroBehaviors name="Assets/Euphoria/Behaviors_Shared.xml"/>
    <MacroBehaviors name="Assets/Euphoria/Behaviors_Jump.xml"/>
    .
    .
    .
    <MacroBehaviors name="Assets/Euphoria/MaleBehaviors_Jump.xml"/>
</Asset>
```

The first portion of asset definition file 502 describes the skeletal mapping (e.g., between a simple skeleton and a full skeleton, respectively). For example, the skeletal volume named "Pelvis" is mapped to the bone specified by the data structure "Hips[0]". The second portion of asset definition file 502 describes the one or more macro behavior files to load. For example, the example asset definition shown in Table 1 specifies at least three macro behavior files including "Assets/Euphoria/MaleBehaviors Jump.xml."

Each macro behavior file includes on or more macro behaviors (e.g., 514a-514n). In addition, each macro behavior includes one or more motion behaviors (e.g., Euphoria behaviors 524a-524n). Each motion behavior also includes one or more parameters 534a-534n. An example macro behavior file is illustrated in TABLE 2 below:

TABLE 2

| <MacroBehaviors> | |
|---|---|
| <MacroBehavior | name="macro name" |
| | initialBufferedVelocityMultiplier="1.0" |
| | continuousBufferedData="true/false" |
| | drivesPosition="true/false" |
| | drivesRotation="false"> |
| <EuphoriaBehavior | name="behavior name" |
| | startStop="true/false"> |
| <Parameter | name="name" |
| | type="int" |
| | value="10" |
| | override="Int_0"/> |
| </EuphoriaBehavior> | |
| </MacroBehavior> | |
| </MacroBehaviors> | |

A macro behavior is defined using one or more values including, name, initialBufferedVelocityMultiplier, continuousBufferedData, drivesPosition, and drivesRotation, to name a few examples. The name value specifies the name by which the particular macro behavior is reference via the execution of code, processing a script, or in any other manner. The initialBufferedVelocityMultiplier value specifies a multiplier that use used to scale the one or more velocities calculated from animation data that is passed to the motion synthesis system 204. For example, an initialBufferedVelocityMultiplier of 1.0 specifies that the initial velocity value is not scaled (i.e., multiplied by a scalar of 1). As another example, an initialBufferedVelocityMultiplier of 0.0 specifies that the initial velocity value is not used (i.e., multiplied by a scalar of 0). The continuousBufferedData value specifies whether or not any of the motion synthesis system 204 behaviors require continuous feeding of the animation transforms. In various implementations, these values are only passed in when a character is coming from a completely animated state (e.g., from an animation script) and transitioning into a behavior-driven state (e.g., a procedurally animated state), or vice-versa. The drivesPosition value indicates if the position of the character should be derived from the physical positions of the simulated body in the motion synthesis system 204. For example, if drivesPosition is false, the motion synthesis system 204 will not substantially alter the character position generated from the simulation. The drivesRotation value indicates if the rotation/facing of the character should be derived from the physical orientation of the simulated body in the motion synthesis system 204. For example, if drivesRotation is false, the motion synthesis system 204 will not substantially alter the character orientation generated from the simulation.

In further implementations, each macro behavior includes one or more motion behaviors. Each of the motion behaviors can be defined using one or more values including name and startStop, to name two examples. The name value specifies the name of the motion behavior that the particular macro behavior references. In various implementations, the name value is defined by the behavior asset definition file 502 and must be substantially similar to a name specified by the motion synthesis system 204. In some scenarios, more than one motion behavior can be associated with a macro behavior. For example, a macro behavior that causes a character to their balance may cause the character to stumble and wing their arms in a manner consistent with someone attempting to regain their balance. The startStop value indicates whether or not this motion synthesis behavior supports start/stop functionality (e.g., whether the motion synthesis behavior can be stopped and/or started before a particular motion ceases). In various implementations, the proper setting for this is indicated by the motion synthesis system 204. For example, the proper setting may be indicated by the presence of the "start" parameter documentation describing the motion synthesis system 204.

In addition, each motion behavior can be configured with one or more parameters. Each parameter can be specified by one or more attributes including name, type, value and override, for instance. The name attribute specifies the name of the motion behavior parameter. In various implementations, the name attribute must be the same or similar to the name expected by the motion synthesis system 204 The type attribute specifies the parameter type. Types can include, for instance, int, float, bool, and char, to name a few examples. The int type is an integer value parameter. The float type is a floating-point value parameter. The bool type is a Boolean value parameter. The char type is a string value parameter.

Each type can also have an associated value defined, as specified by the value attribute. In general, the value attribute specifies a default value to use for the particular parameter if not otherwise overridden. For all type attributes it is possible to specify a single value. For the int, float and bool types it is also possible to specify a range of values that the macro behavior system 206 randomly selects within. The format for an example attribute value range is "low_value to high_value" (e.g., "0.3 to 10.0" or "5 to 7").

The override attribute specifies the override parameter slot to assign this parameter. In various implementations, the override attribute is a string indicating both an override type as well as a numeric slot for that type, in the format type_slot.

Override strings include, "VectorX_0," "Int_3," and "BodyPart_7," to name a few examples. In various implementations, the macro behavior system 206 can process numerous override types including, VectorX, VectorY, VectorZ, Float, Int, Char, BodyPart, PhysicsEntity, DynamicFloat, DynamicInt, DynamicBool, DynamicChar, and DynamicVector, to name some examples.

By way of illustration, if a macro behavior has three float parameters, there would be three different parameter slots to hold those values. One parameter would be assigned to slot Float_0, the next to slot Float_1, and the last to slot Float_2, so that each can each have unique values passed in. Conversely, if it was specified that Float_0 was to be used for all of the parameters, the parameters would all receive the same value that was placed into the Float_0 override parameter.

The VectorX, VectorY, and VectorZ override types specifies that the x, y, or z components, respectively, of the override vector in the defined slot will be used as the value for the particular parameter. The Float, Int, and Char override types specifies that the float, int, or string value, respectively, in the defined slot will be used as the value for the particular parameter. The BodyPart override type specifies the appropriate integer index of the body part associated with a crc32 name in the defined slot will be used as the value for this parameter. In various implementations, the crc32 name is translated by the system into an integer body index for use by the motion synthesis system 204 during runtime operation. The PhysicsEntity override type specifies that the physics entity (e.g., a pointer data type associated with a physics entity data structure) in this override slot will be used as the value for the particular parameter. In various implementations, the PhysicsEntity is translated by the system 200 into a pointer data type associated with a rigid body used by the physics engine 208 for use by the motion synthesis system 204 during runtime operation. The DynamicFloat, DynamicInt, DynamicBool, DynamicChar, and DynamicVector override types specify that the float, int, Boolean, string value, or vector value, respectively, corresponding to a pointer data type in the defined override slot will be used as a dynamic parameter in the motion synthesis system 204. In general, the system 200 performs the necessary translation and runtime hookups to provide the functionality that allows for changes to the original value passed in to automatically affect the motion synthesis system 204 during runtime operation without sending additional messages.

A macro behavior can be executed in a variety of ways. For example, the game engine 202 can execute one or more macro behaviors through code 506, that when executed, provides the motion behavior system 206 the name of the macro behavior as well as providing any override data that the executed code specifies. As another example, animation events 508 (e.g., animation events generated by specific keyframes) can trigger one or more macro behaviors. In general, it is possible to layer macro behaviors by starting one after the other. For example, a staggering macro behavior can be started and then a macro behavior corresponding to an arms flailing motion can be started to generate a motion behavior that when provided to the motion synthesis system 204 generates a description of motion for a character that is staggering with arms flailing.

Figure 6A:
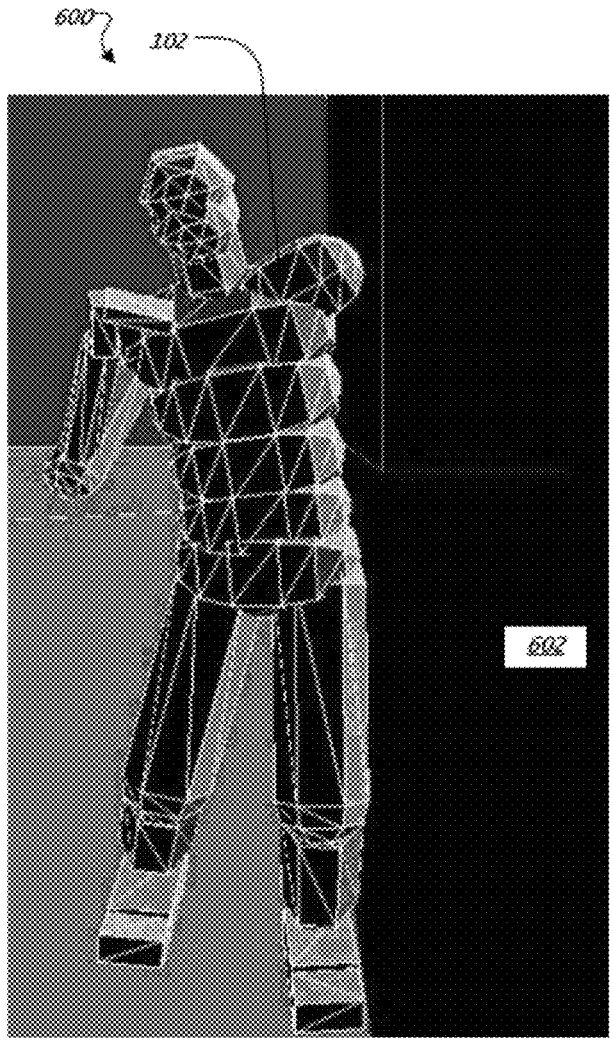
FIGS. 6A and 6B are screenshots showing examples of in-game representations with interpenetrations.
Figure 6B:
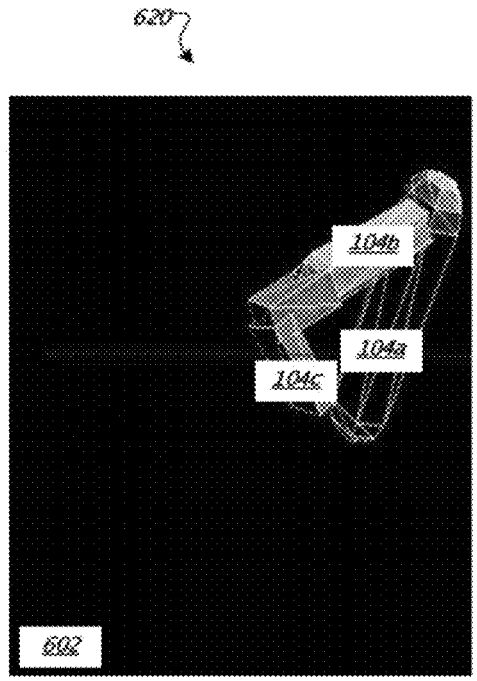

FIGS. 6A and 6B are screenshots 600 and 620, respectively, of an in-game representation with interpenetration. The screenshots 600 and 620 are not to scale and are used for illustrative purposes. In general, interpenetration occurs when one or more portions of a character penetrate or otherwise interact with the subsurface geometry of another object. For example, character 102 has a portion of their respective skeletal structure (e.g., arm bones 104a, 104b, and 104c) interpenetrating a wall 602. In various implementations, interpenetration occurs with a large force is applied to one or more portions of a character. In some scenarios, the force applied is large enough to push a portion of one object into the subsurface geometry of another object. For example, character 602 may have been knocked off their feet with such force that a portion of their arm, represented by bones 104a-104c, becomes lodged in a portion of the wall 602.

In general, if the representations illustrated by FIGS. 6A and 6B are provided to motion synthesis system 204, some or all of the procedurally generated animations for character 102 may not resemble human-like motions. For example, the character may not move because doing so would violate one or more constraints. As another example, because the character may be able to move a small amount before the constraints are violated, the constraints may cause the character to move in a lurching, non-fluid manner. In other words, because a portion of the character may become stuck in or attached to the interpenetrated object, this can reduce the human-like qualities of the procedurally generated animations.

Figure 7:
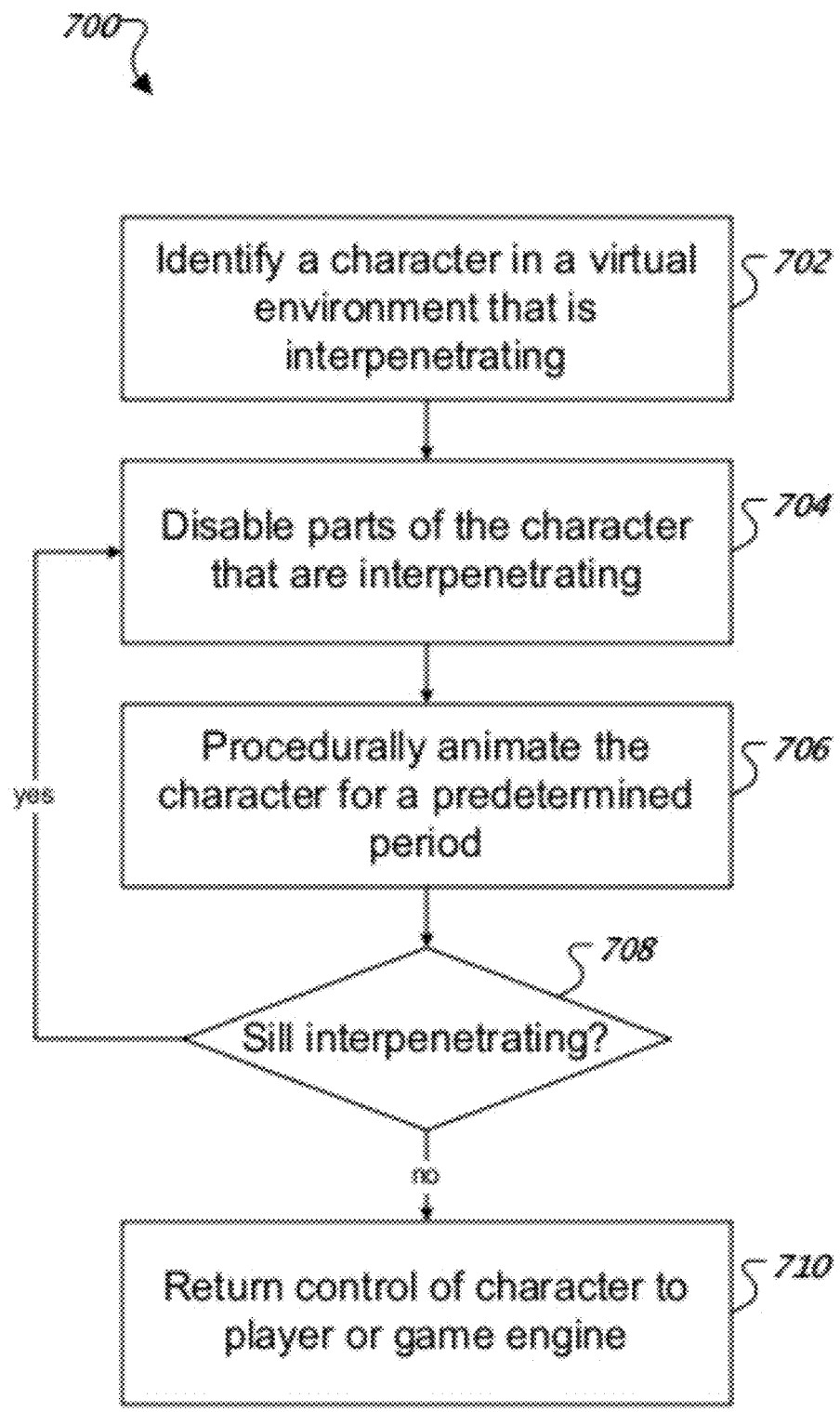
FIG. 7 is a flow chart of an example method for correcting procedural animations where one or more portions of a character are interpenetrating.

FIG. 7 is a flow diagram of an example technique 700 for correcting procedural animations where one or more portions of a character are interpenetrating. In general, technique 700 can be executed by system 200 during generation of one or more procedural animations. For example, technique 700 can be executed by system 200 when the physics engine 208 modifies one or more motion descriptions.

In step 702, a character in a virtual environment that is interpenetrating is identified. In general, one or more collisions can be detected using a hierarchical tree structure. For example, consider a character's skeleton where the central portion (e.g., the torso) is the root node of the tree and one or more extremity portions (e.g., the limbs) are leaf nodes of the tree. The positions of the nodes can be compared to positions of other objects in the virtual environment. For example, the positions of the limbs can be compared to the position of a wall in the virtual environment. In some implementations, comparing the positions of the nodes can be accomplished by first determining if any of the constraints have been violated. If one or more constraints have been violated, then a ray can be cast from the portion of the skeleton that violate the constraints to another portion of the skeleton that violate the constraints to determine if there is an object between them. For example, if the ray touches an object between the two skeletal portions, then there is another object between the portions.

In step 704, parts of the character that are interpenetrating are disabled. In general, one or more aspects of a character's animation state can be modified. For example, the collisions for the one or more portions of the character are disabled. As another example, the constraints for the one or more portions of the character that are interpenetrating are disabled. In various implementations, the disabling of the constraints and/or the disabling of the collisions is determined based on the hierarchical tree structure. For example, nodes that are furthest from the root node are disabled before the nodes that are closer to the root node.

In step 706, the character is procedurally animated for a predetermined period. For example, the system 200 can perform technique 300 to generate one or more frames of animation. In general, the frames of animation generated by technique 300 correspond to the disabled collisions and/or the disabled constraints. For example, if one or more constraints are disabled, the portions of the skeletal structure that are interpenetrating may move farther apart for a certain number of frames before moving closer together.

In step 708, the system 200 determines if portions of the skeletal structure are still interpenetrating. In some implementations, one or more one or portions of step 702 may be used to determine if portions of the skeletal structure are still interpenetrating. For example, violated constraints can be identified and rays cast between portions that violate the constraints to determine if there is an object between the two portions of the skeletal structure that violate the constraints. If there are additional portions of the skeletal structure that are still interpenetrating, then system 200 may execute step 704. In various implementations, additional portions of the skeletal structure are determined corresponding to their respective positions in the hierarchical tree structure. In other words, the next portions that are farthest from the root node are disabled. In various implementations, the process of repeatedly disabling the next portions that are farthest from the root node is performed until the portions of the skeletal structure are not interpenetrating other objects.

In step 710, control of the character is returned to the player or game engine. In general, the system 200 may return the character's animation state to some previous value or set of values. For example, the system 200 can re-enable the collision detection for the previously disabled nodes. As another example, the system 200 can re-enable to the constraints for the previously disabled nodes.

Figure 8:
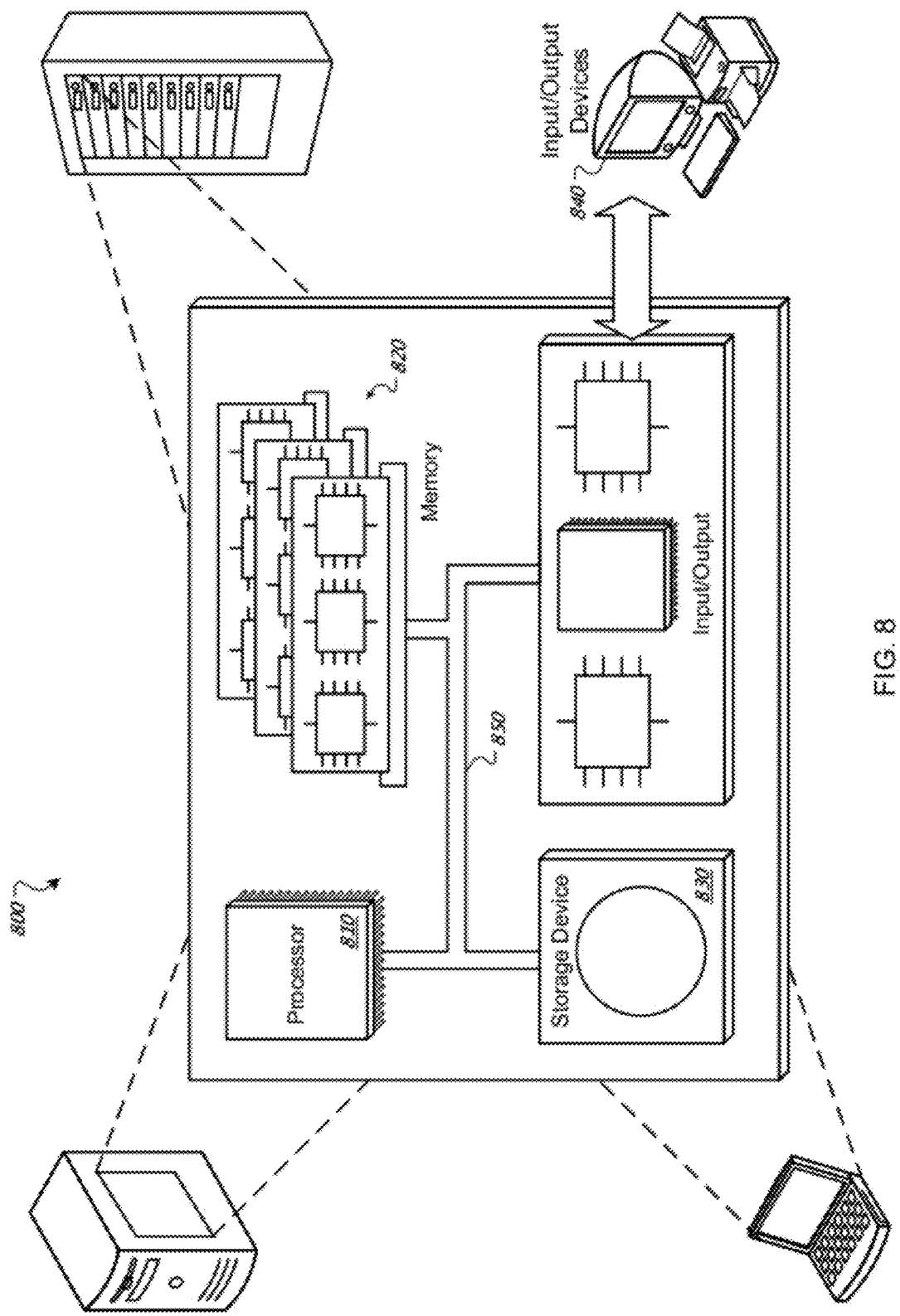
FIG. 8 is a schematic diagram of an example of a generic computer system.

FIG. 8 is a schematic diagram of an example of a generic computer system 800. The system 800 can be used for the operations described in association with the method 300 according to one implementation. For example, the system 800 may be included in computer game system 200.

The system 800 includes a processor 810, a memory 820, a storage device 830, and an input/output device 840. Each of the components 810, 820, 830, and 840 are interconnected using a system bus 850. The processor 810 is capable of processing instructions for execution within the system 800. In one implementation, the processor 810 is a single-threaded processor. In another implementation, the processor 810 is a multi-threaded processor. The processor 810 is capable of processing instructions stored in the memory 820 or on the storage device 830 to display graphical information for a user interface on the input/output device 840.

The memory 820 stores information within the system 800. In one implementation, the memory 820 is a computer-readable medium. In one implementation, the memory 820 is a volatile memory unit. In another implementation, the memory 820 is a non-volatile memory unit.

The storage device 830 is capable of providing mass storage for the system 800. In one implementation, the storage device 830 is a computer-readable medium. In various different implementations, the storage device 830 may be a floppy disk device, a hard disk device, an optical disk device, or a tape device.

The input/output device 840 provides input/output operations for the system 800. In one implementation, the input/output device 840 includes a keyboard and/or pointing device. In another implementation, the input/output device 840 includes a display unit for displaying graphical user interfaces.

The features described can be implemented in digital electronic circuitry, or in computer hardware, firmware, software, or in combinations of them. The apparatus can be implemented in a computer program product tangibly embodied in an information carrier, e.g., in a machine-readable storage device or in a propagated signal, for execution by a programmable processor; and method steps can be performed by a programmable processor executing a program of instructions to perform functions of the described implementations by operating on input data and generating output. The described features can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors of any kind of computer. Generally, a processor will receive instructions and data from a read-only memory or a random access memory or both. The essential elements of a computer are a processor for executing instructions and one or more memories for storing instructions and data. Generally, a computer will also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with a user, the features can be implemented on a computer having a display device such as a CRT (cathode ray tube) or LCD (liquid crystal display) monitor for displaying information to the user and a keyboard and a pointing device such as a mouse or a trackball by which the user can provide input to the computer.

The features can be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include, e.g., a LAN, a WAN, and the computers and networks forming the Internet.

Thus, particular embodiments of the invention have been described. Other embodiments are within the scope of the following claims. For example, the actions recited in the claims can be performed in a different order and still achieve desirable results.

What is claimed is:
1. A computer-implemented method comprising:
 identifying a computer-generated character comprising one or more parts that are interpenetrating in a real-time game environment, where the computer-generated character is represented by a hierarchical tree structure of parts and a root of the tree is a central part and leaves of the tree are extremity parts, where said identifying the computer-generated character comprising the one or more parts that are interpenetrating in the real-time game environment comprises:
- detecting two parts of the computer-generated character that are separated by a distance that exceeds a constraint threshold; and
- raycasting between the two parts and determining whether an object is between them;

disabling from collisions the parts of the computer-generated character that are interpenetrating and the parts further from the root of the tree than the interpenetrating parts in the hierarchical tree structure;

procedurally animating the computer-generated character using a motion synthesis system and a physics engine for a pre-determined amount of simulated time; and re-enabling collisions of the disabled parts.

2. The method of claim 1, further comprising:
determining whether the identified parts are still interpenetrating after said procedurally animating the computer-generated character for the pre-determined amount of simulated time; and
performing said re-enabling the collisions of the disabled parts based on a result of the determination.

3. The method of claim 2, further comprising:
in response to determining that the identified parts are still interpenetrating, disabling from collisions other parts of the computer-generated character that are farther from the root of the tree than the previously disabled parts; and
repeating said procedurally animating the computer-generated character using the motion synthesis system and the physics engine for the pre-determined amount of simulated time.

4. The method of claim 2, further comprising performing said re-enabling the collisions of the disabled parts in response to determining that the identified parts are not interpenetrating.

5. A program product encoded on a non-transitory computer-readable medium, the program product including instructions that, when executed by data processing apparatus, cause the data processing apparatus to perform operations comprising:
identifying a computer-generated character comprising one or more parts that are interpenetrating in a real-time game environment, where the computer-generated character is represented by a hierarchical tree structure of parts and a root of the tree is a central part and leaves of the tree are extremity parts, where the operation of identifying the computer-generated character comprising the one or more parts that are interpenetrating in the real-time game environment comprises:
- detecting two parts of the computer-generated character that are separated by a distance that exceeds a constraint threshold; and
- raycasting between the two parts and determining whether an object is between them;

disabling from collisions the parts of the computer-generated character that are interpenetrating and the parts further from the root of the tree than the interpenetrating parts in the hierarchical tree structure;
procedurally animating the computer-generated character using a motion synthesis system and a physics engine for a pre-determined amount of simulated time; and
re-enabling collisions of the disabled parts.

6. The program product of claim 5, wherein the operations further comprise:
determining whether the identified parts are still interpenetrating after said procedurally animating the computer-generated character for the pre-determined amount of simulated time; and
performing the operation of re-enabling the collisions of the disabled parts based on a result of the determination.

7. The program product of claim 6, wherein the operations further comprise:
in response to determining that the identified parts are still interpenetrating, disabling from collisions other parts of the computer-generated character that are farther from the root of the tree than the previously disabled parts; and
repeating the operation of procedurally animating the computer-generated character using the motion synthesis system and the physics engine for the pre-determined amount of simulated time.

8. The program product of claim 6, wherein the operations further comprise performing the operation of re-enabling the collisions of the disabled parts in response to determining that the identified parts are not interpenetrating.

9. A system comprising:
a display device;
machine-readable storage device including a program product; and
one or more processors operable to execute the program product, interact with the display device, and perform operations comprising:
identifying a computer-generated character comprising one or more parts that are interpenetrating in a real-time game environment, where the character is represented by a hierarchical tree structure of parts and the root of the tree is a central part and the leaves of the tree are extremity parts, where the operation of identifying the computer-generated character comprising the one or more parts that are interpenetrating in the real-time game environment comprises:
- detecting two parts of the computer-generated character that are separated by a distance that exceeds a constraint threshold; and
- raycasting between the two parts and determining whether an object is between them;

disabling from collisions the parts of the computer-generated character that are interpenetrating and the parts further from the root of the tree than the interpenetrating parts in the hierarchical tree structure;
procedurally animating the computer-generated character using a motion synthesis system and a physics engine for a pre-determined amount of simulated time and
re-enabling collisions of the disabled parts.

10. The system of claim 9, wherein the operations further comprise:
determining whether the identified parts are still interpenetrating after said procedurally animating the computer-generated character for the pre-determined amount of simulated time; and
performing the operation of re-enabling the collisions of the disabled parts based on a result of the determination.

11. The system of claim 10, wherein the operations further comprise:
in response to determining that the identified parts are still interpenetrating, disabling from collisions other parts of the computer-generated character that are farther from the root of the tree than the previously disabled parts; and repeating the operation of procedurally animating the computer-generated character using the motion synthesis system and the physics engine for the pre-determined amount of simulated time.

12. The system of claim 10, wherein the operations further comprise performing the operation of re-enabling the collisions of the disabled parts in response to determining that the identified parts are not interpenetrating.

\* \* \* \* \*